July 3, 1951  S. WESTIN ET AL  2,558,889
METHOD AND APPARATUS FOR PROGRESSIVELY ELECTRIC
RESISTANCE BUTT WELDING SEAMS AT HIGH SPEED
Filed Nov. 10, 1948  5 Sheets-Sheet 1
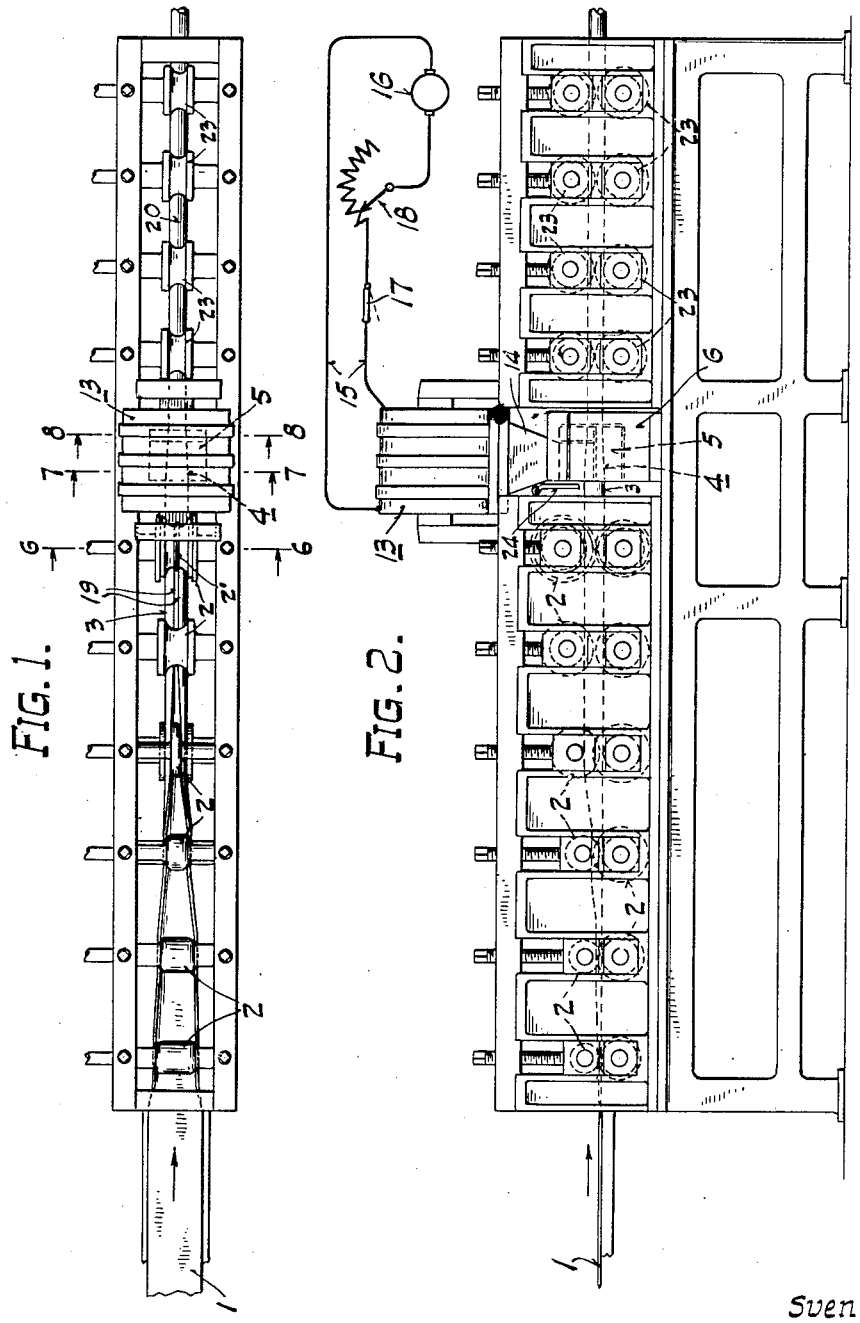
Sven Westin
Axel Westin
INVENTORS.
BY
ATTORNEY.

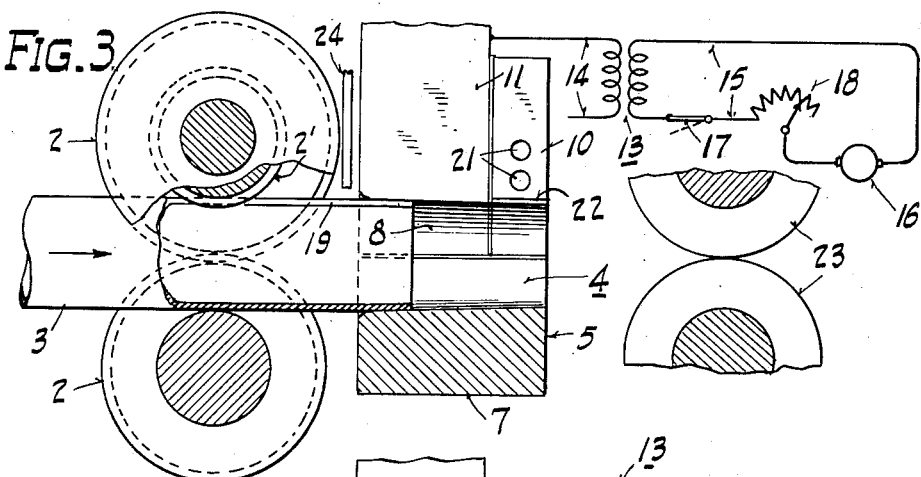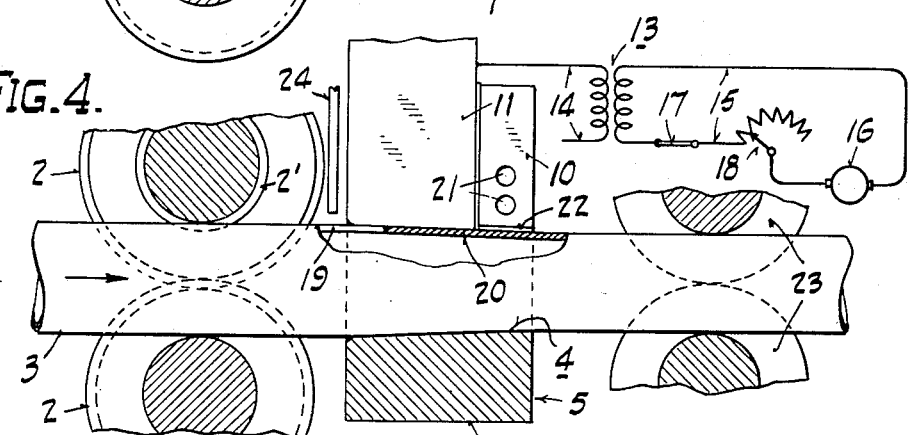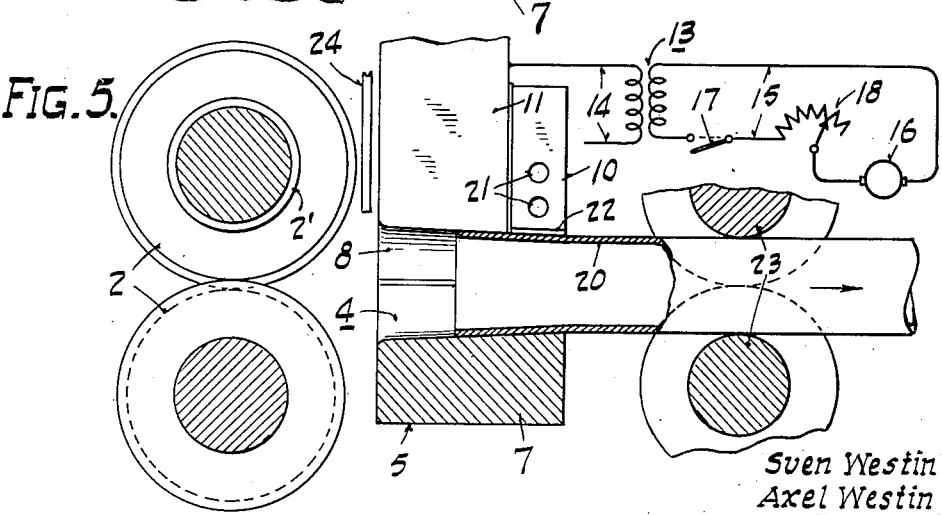

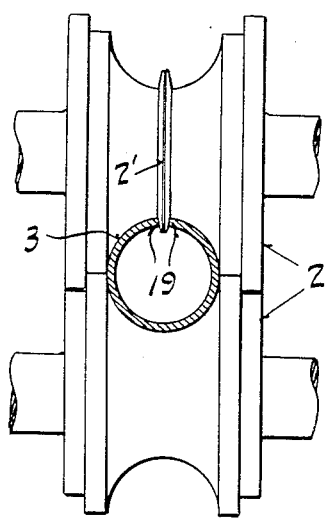
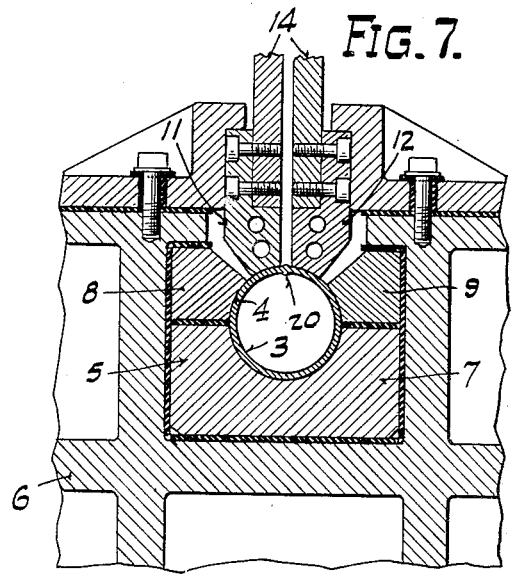
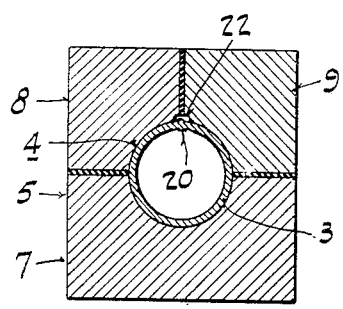
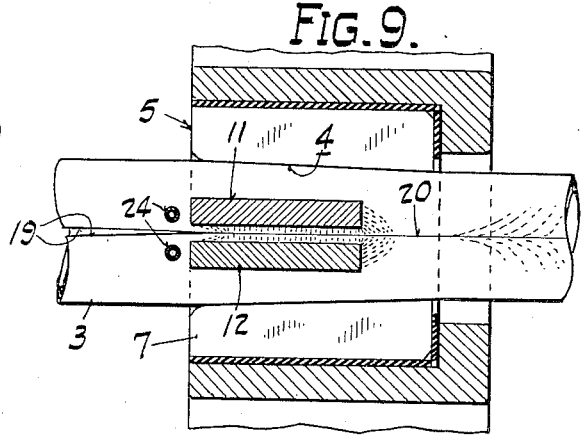
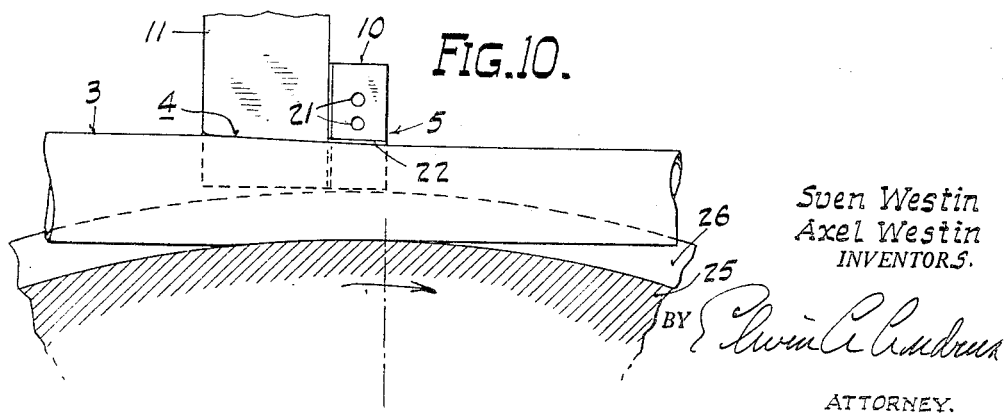

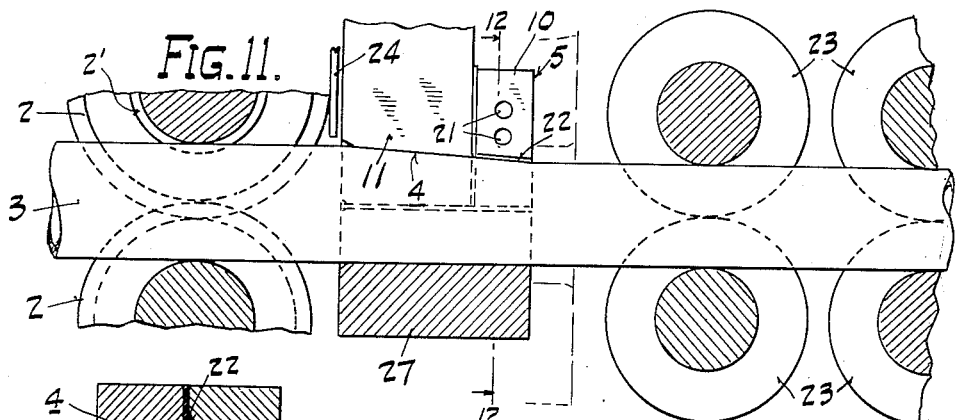
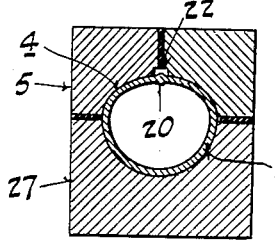
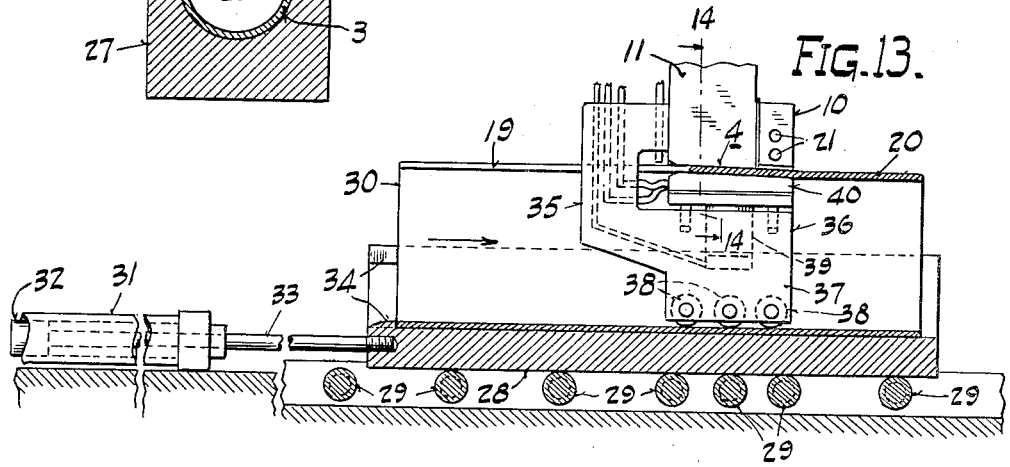
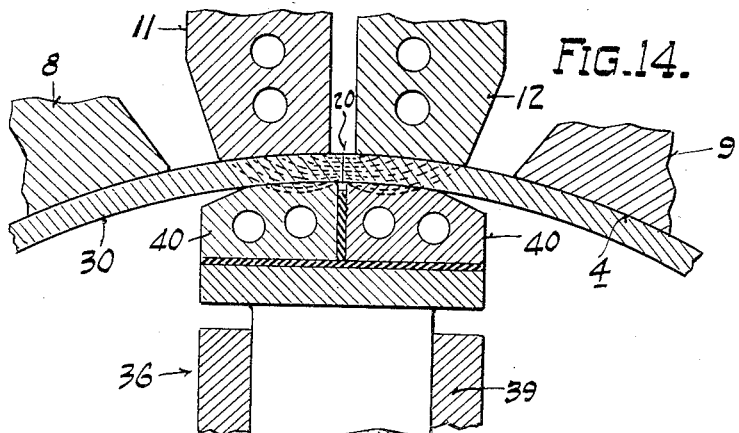
Sven Westin
Axel Westin
INVENTORS.

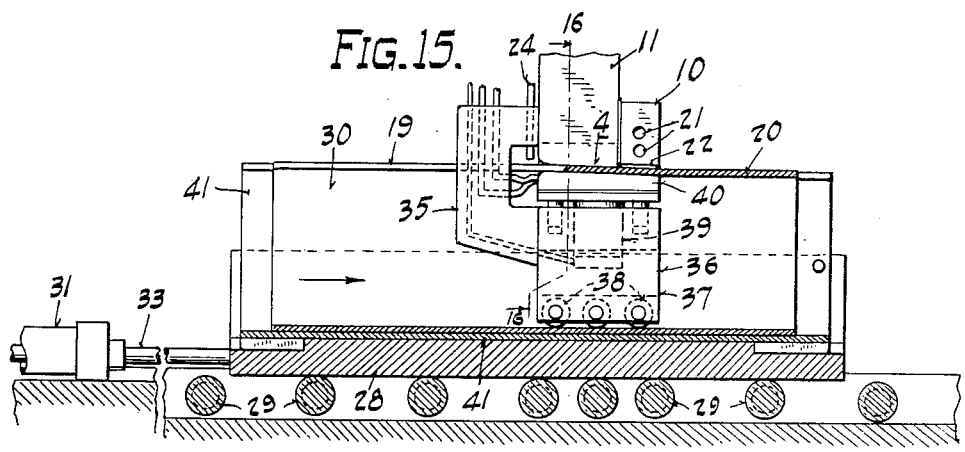
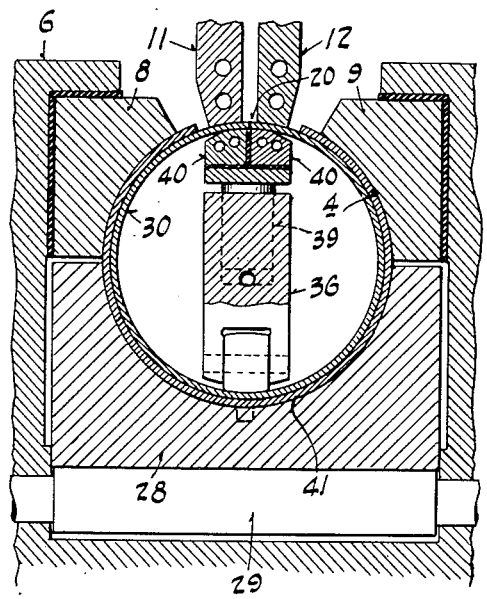 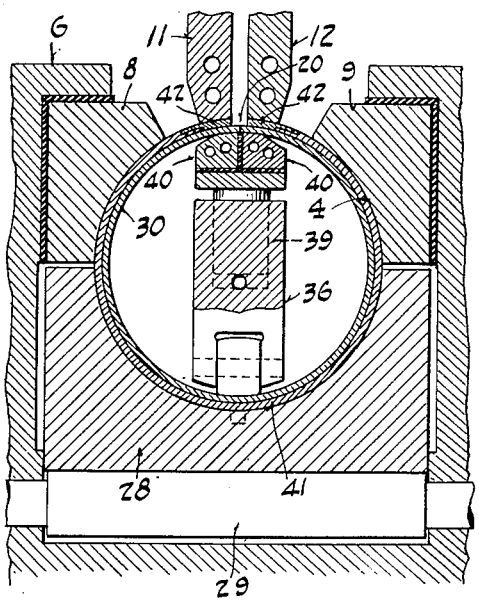
Sven Westin
Axel Westin
INVENTORS

Patented July 3, 1951

2,558,889

UNITED STATES PATENT OFFICE 2,558,889

METHOD AND APPARATUS FOR PROGRESSIVELY ELECTRIC RESISTANCE BUTT WELDING SEAMS AT HIGH SPEED

Sven Westin, Elm Grove, and Axel Westin, Milwaukee, Wis., assignors to The Westin Process Company, a partnership Application November 10, 1948, Serial No. 59,262

33 Claims. (Cl. 219—10)

This invention relates to a method and apparatus for progressively electric resistance butt welding seams at high speeds, particularly in metal sheet and plate material.

The invention has been applied specifically to welding of the longitudinal butt seams in metal tubing and pipe of all sizes and has been found applicable to the welding of stainless steels which heretofore have required slow and difficult welding procedures making it impossible to weld many sizes and thicknesses of the material. When applied to ordinary carbon steels the invention enables the production of pipe sizes and wall thicknesses not heretofore possible of welding with roller electrode processes.

In all cases the speed of welding by the present method is phenomenally greater than any possible speed attained by methods heretofore used.

One of the principal objects of the present invention is to provide a new method and apparatus for progressively electric resistance butt welding seams in metal sheet and plate material that present the advantages of higher speed, higher weld quality, low upset loss of material, and practically no sensitivity to normal physical tolerance requirements in the preparation of the edges for welding.

Another object of the invention is to provide a method and apparatus for progressively electric resistance butt welding seams in metal sheet and plate material of definite length and in which the weld is of uniform high quality throughout the entire length of the material being welded, thereby avoiding the usual waste encountered at the ends of pipe blanks and the like by other progressive electric resistance butt welding processes.

Another object of the invention is to provide a method and apparatus applicable to the progressive electric resistance butt welding of stainless steels and the like.

Another object is to greatly increase the speed of progressive electric resistance welding without requiring special and expensive high frequency welding currents.

Another object is to provide for the reduction of friction between the blank and a pair of electrode shoes and to prevent sticking of copper to the blank.

Another object is to provide an improved distribution of the welding current to and across the abutting edges of the blank.

Another object is to control the application of welding pressure to the blank and prevent injury to the latter from the pressure applying means.

More specific objects and advantages of the invention will be explained hereinafter.

The welder comprises, in general, a welding throat through which the abutting seam edges of plate material are passed, and a suitable feeding mechanism for the blank material.

The welding throat is made up of pressure applying means in combination with electric resistance heating means effective to pass heating current across the pressure abutted edges as the latter move progressively through the throat.

The general features of the welder described above are not far different from those found in the present day welders for the commercial roll electrode process exemplified in the Johnston Patent No. 1,388,434.

The present invention utilizes the desirable features of the Johnston process and at the same time overcomes the many undesirable features which limit the use of the process and make it inapplicable to certain sizes of pipe and to the welding of certain alloy material.

According to the present invention the welding throat is constructed to provide a sustained upsetting pressure upon the abutting edges over a predetermined longitudinally extending zone and at the same time the resistance heating current is applied across the edges throughout substantially the longitudinal extent of the pressure zone, whereby a correlation between the heating and upsetting action is obtained to continually compensate for the tendency of the heat to soften the material back of the edge faces so that the relatively cold metal adjacent the heated edge faces is utilized to apply the final welding pressure.

By providing a longitudinally extending pressure and heating zone as distinguished from the substantially instant line throat of the Johnston process, the present invention compensates for wider physical tolerances in blank dimensions than is possible with the Johnston process.

The present invention makes practical the application of progressive electric resistance butt welding to thick walls and also to either thick or thin walled large diameter pipe, wherein physical tolerance limitations prevent the roll electrode Johnston process from being employed.

Attempts have been made heretofore to lengthen the heating zone of the Johnston process for other purposes, as exemplified in the patents to Mark No. 1,864,139 and to White No. 1,874,399, but these have not been commercial, largely due to the fact that the heating zone was substantially longer than the pressure zone and no appreciation was present of the necessity for a sustained upsetting pressure throughout the heating zone.

The present invention differs primarily from these early attempts to modify the Johnston process, in that the zone of current application across the edges of the blank is coextensive with and even preferably somewhat shorter than the zone of pressure application, and the heating and upsetting are correlated to mutually compensate or assist each other as the blank progresses through the extended welding throat. Furthermore, the present invention utilizes the principle of stopping the heating effect as rapidly as possible after the weld is completed, so that the weld is cooled and congealed rapidly and thereby becomes strong enough to sustain itself against the tendency of the seam cleft to open due to spring back of the blank. Preferably, a water-cooled die throat confines the blank during this congealing of the weld and prevents any possible opening of the seam cleft, a feature particularly important in stainless steel welding due to the high fluidity of the metal at the weld and the slow cooling of the same.

The speed of welding with the present invention is truly phenomenal. Best results are obtained when the speed of movement of the blank through the welder is sufficient to produce in the weld the recurrent stitch pattern so noticeable in the Johnston process.

The present application constitutes a continuation-in-part of abandoned applications Ser. No. 665,656, filed April 29, 1946, for Method and Apparatus for Electric Resistance Welding Pipe; Ser. No. 665,657, filed Apr. 29, 1946 for Electric Resistance Welding of Metal Pipe; Ser. No. 682,012, filed July 8, 1946, for Pipe Welding, and Ser. No. 725,936, filed Feb. 1, 1947, for Welding of Tubular Metal Articles; and the allowable subject matter of said abandoned applications has been transferred to this application.

The accompanying drawings illustrate an apparatus embodying the apparatus features of the invention and suitable for use in carrying out the method of the invention as applied to the welding of pipe.

In the drawings:

Figure 1 is a schematic top plan layout of a pipe welder;

Fig. 2 is a corresponding side elevation of the welder;

Fig. 3 is an enlarged vertical axial section through the welder showing a pipe blank entering the same;

Fig. 4 is a similar section showing the pipe blank progressing through the welder;

Fig. 5 is a similar section showing the welding of the tail end of the blank;

Fig. 6 is a detail transverse vertical section taken on line 6—6 of Fig. 1 showing the edge spacer and guide disposed ahead of the welding die;

Fig. 7 is a transverse vertical section taken on line 7—7 of Fig. 1 showing the welding die and electrode inserts;

Fig. 8 is a transverse vertical section taken on line 8—8 of Fig. 1 showing the construction of the rear end of the die for completing the welding operation;

Fig. 9 is an enlarged schematic plan illustration of the welding operation showing the zone of current flow and the heat back obtained;

Fig. 10 is a detail axial section of a modified form of welding throat utilizing a roll support for the blank and adapted to be used in the machine of Figs. 1 to 9;

Fig. 11 is a section similar to Fig. 4 showing a modified form of die wherein the back of the die is semi-cylindrical;

Fig. 12 is a transverse vertical section taken on line 12—12 of Fig. 11;

Fig. 13 is an axial section showing a welder in which the lower half of the die moves with the blank being welded, and a mandrel is employed to obtain the required electrode contact pressure;

Fig. 14 is a transverse vertical section taken on line 14—14 of Fig. 13 and showing how the current flow through the wall of the blank is improved by the mandrel;

Fig. 15 is a vertical axial section through the welder of Fig. 13 showing the use of a backing sleeve for thin wall blanks;

Fig. 16 is a transverse vertical section taken on line 16—16 of Fig. 15; and

Fig. 17 is similar to Fig. 16 showing another sleeve construction.

Figs. 1 to 12 illustrate an apparatus for welding tubing from strip material wherein the flat strip 1 is moved longitudinally at a high speed, generally in excess of one hundred feet per minute, through a series of forming rolls 2 to form the same progressively and continuously into a cylindrical shape with the longitudinal edges in opposed spaced relation preparatory to welding.

The cylindrical blank 3 progressing from the last of the forming rolls 2 is fed immediately through the welding throat 4.

The welding throat 4 illustrated comprises a welding bell in the form of a die 5 made up of a plurality of complementary sections set in a fixed frame 6 and having a frusto-conical opening therethrough aligned axially with the blank 3 as the latter emerges from the rolls 2. The end of the die opening having the larger diameter, faces rolls 2 and constitutes the mouth of the welding throat. The smaller diameter end of the die opening at the rear end of the die constitutes the final die throat that completes the weld. The drawings illustrate the taper of the die throat somewhat exaggerated in proportion to the diameters involved.

The die 5 is preferably made up of a plurality of sections insulated from one another. The bottom half section 7 of die 5 extends throughout the length of the welding throat 4 and constitutes the bottom support for blank 3 as the latter moves through the welding throat. The top half of die 5 is made up of two separate quarter sections 8 and 9 spaced apart on opposite sides of the blank and which may extend for the full length of the welding throat, but preferably are cut short of the rear end of the bottom section to provide space for a fourth section 10 which extends across the top of the blank and cooperates directly with section 7 in completing the final weld of the blank.

A pair of electrodes 11 and 12 are positioned in the space between die sections 8 and 9 on opposite sides of the blank 3 and constitutes complemental parts of the die 5 extending from the mouth of the die to the rear end thereof, or to section 10 of the die where section 10 is provided. The laterally spaced electrodes 11 and 12 are longitudinally extending die shoes preferably constructed of electrically conductive copper alloy such as a hard bronze alloy. The electrodes 11 and 12 have wear-resistant contact faces which engage blank 3 and are shaped to provide the corresponding parts of the frusto-conical opening in die 5.

A suitable welding transformer 13 has its secondary leads 14 connected oppositely to the electrodes 11 and 12 to supply a high ampere welding current thereto. The primary leads 15 of transformer 13 are connected to a suitable source 16 of alternating current. A switch 17 in one of the leads 15 serves to initiate and terminate the supply of welding current to the welder. The transformer 13 may be of multiple tap construction to adjust the same for different welding operations. A rheostat 18 may be additionally employed in one of the leads 15 to provide for adjustment of the voltage during a particular welding operation, as at the beginning and the end of the welding.

The current employed is preferably sixty cycle alternating current which may be obtained from any power line. Higher cycle and special currents may be employed, if desired, but generally the invention eliminates the necessity for these.

As the front end of blank 3 passes into the welding throat the end of the blank becomes circumferentially confined by the die 5 with the spaced longitudinal edges 19 of the blank held in initially spaced relation by means of the fin 2' incorporated in the last top roll 2, and which fin serves to align the edges with the welding throat so that the shoe electrodes 11 and 12 will engage the blank in equally spaced relation from the corresponding edges.

As the forward end of blank 3 first engages sections 7, 8 and 9 and electrodes 11 and 12 of die 5, the current source should not be applied to the electrodes, or if it is, rheostat 18 should be adjusted to prevent burning of the blank due to the relatively small area of initial contact with the electrodes. After the blank 3 reaches about the position shown in Fig. 3 where the edges 19 are pressure abutted and the end of the blank has started to contract and to effect pressure contact with the electrodes 11 and 12, the welding current may be applied in full to the blank.

The welding current should be adjusted to the speed of the blank 3 and the amount and rate of upset of the edges effected as the blank passes through the die 5, to provide the necessary heat softening of the faces of edges 19 for the upsetting action, without heat softening the metal back of and adjacent the edge faces sufficiently to destroy the required final welding pressure. It is desirable to have the heating of the edge faces and the upsetting thereof take place simultaneously and coextensively and be of a related order so that the edges may have time to coalesce under a sustained heating and pressure until they reach the final welding position in the die where the cold metal immediately adjacent the edge faces is capable of applying a maximum welding pressure thereto.

It is preferable not to have the electrode shoes 11 and 12 contact with the blank any substantial distance ahead of the point of closing of the edges 19 together, since it is desirable to avoid any tendency of the edges to burn or melt out due to a concentration of current thereacross at the point of closure. Furthermore, any large concentration of current at the point of edge closure will tend to produce a heat back that is not fully compensated by the progressive upsetting of the edges as the blank passes through the die. Fig. 9 illustrates a suitable concentration of current flow which may be employed to initially heat the edges as they pass into the welding throat. The current flow lines are shown extending across the seam between the electrodes 11 and 12.

Fig. 9 also illustrates the flow of heating current across the seam for a short distance after the blank leaves the electrodes 11 and 12. In general this current flow is not injurious to the seam, but where there is a large spring back in the blank tending to split the seam, or where, as in the case of stainless steel, the welded edge faces remain highly fluid for a longer distance, such a continued heating may be objectionable.

It is preferably, therefore, to shorten the electrodes 11 and 12, as shown in Figs. 1 to 9 and to employ the added die section 10 at the rear end of the electrodes to cooperate with die section 7 and continue the upsetting welding pressures after the seam 20 has passed out of the zone of heating and until the seam has coalesced and cooled sufficiently to be fully self-sustaining. The final heat dissipating lines in the blank are shown to spread outwardly from the seam as the latter leaves the welding throat 4 and continues free from die section 10.

The die section 10 should be water-cooled, as by passages 21 therein to assist in cooling of the weld seam 20. A groove 22 in die section 10 is disposed to permit passage therethrough of any normal upset flash on the seam 20.

In carrying out the process it is also desirable to water-cool the electrodes 11 and 12 to assist in preventing any undue heat-back from the faces of edges 19 where high heat concentrations are necessary.

As the welded blank is discharged progressively from the welding throat 4 a second series of rolls 23 engage the same and cooperate with the rolls 2 in continuing the movement of the blank through the welding throat. Rolls 23 continue to pull the tail end of the blank 3 through the welding throat 4 after the blank leaves rolls 2.

In order to obtain satisfactory and complete welding of the blank to the tail end thereof without overheating and melting out of the seam, it is desirable to cut off the heating current or to greatly reduce it as the end edge of the blank approaches about half way through the effective contacting part of die 5, a position illustrated in Fig. 5. In this way the disproportionate relation between current concentration and upsetting pressure resulting as the entire current becomes concentrated across a shorter seam length is in part compensated and in part avoided.

The friction encountered in moving blank 3 through die 5 can be largely compensated by applying oil to the outer surface of the blank prior to its entry into the die. This is particularly desirable with respect to the electrodes 11 and 12, and the welder illustrated has an oil drip tube 24 located at the front end of each electrode to apply oil to the surface of the blank immediately prior to its contacting with the respective electrode.

The amount of upset required to complete the weld should be kept as little as possible consonant with the requirement for overcoming variations arising from the physical tolerances of the blank edges. In general, the upset should be no greater than a total circumferential contraction of abutting upset equal to about the wall thickness of the blank.

In general, the welding throat 4 should have an effective length of contact with the blank of from about ten to thirty times the wall thickness, or the amount of the upset. Satisfactory results are obtained for average sized tubing and pipe where the length of the pressure contact zone of the welding throat 4 is about three inches.

Too long a taper for the die providing too long a pressure upsetting zone may result in over heating and too great a heat-back, and possible inability to obtain the desired welding pressures. The longer and less steep the taper, the lower the current concentration required; and the shorter and more steep the taper, the higher should be the current concentration. Both the length of the taper and the steepness or contraction thereof should vary with the thickness of the blank to obtain the best resutls.

The lengthening of both the zone of pressure and of heating in the present invention to a substantial zonal length as compared to the instant application of pressure and heat in the Johnston process, provides the necessary time element for the coalescing of the weld so important in stainless steel, and also provides for the take-up of any irregularities in the edges, thereby compensating for any lack of accurate mechanical preparation and uniformity of the blank edges.

The process of the invention may be carried out in various different constructions of apparatus. Where, for instance, it is desirable to reduce the friction on the blank and avoid scratches on its surface, the bottom section 7 of die 5 may be replaced by a large diameter roll 25, as shown in Fig. 10.

Roll 25 has a groove 26 in its outer circumference which is preferably semi-circular in cross-section having a diameter corresponding to the diameter of the incoming blank 3 or a very slight amount less.

The roll 25 should be positioned relative to the upper half of die 5 so that the rear end of the die closes upon the periphery of the roll and is nearest the roll. In this way the roll 25 simulates the bottom section 7 of die 5 and cooperates with the upper half of die 5 to apply a maximum final welding pressure at the rear end of the die.

The diameter of the roll 25 should be sufficient to provide the required small take-up of the blank 3 as it passes through the welding throat and apply the sustained welding pressure to the edges throughout the length of current application thereto by electrodes 11 and 12. In general, the roll 25 should have a diameter of about twelve feet in order to provide the three-inch length of the welding throat desired. This diameter may vary depending upon the amount and rate of upset desired.

Another modification of apparatus is illustrated in Figs. 11 and 12 wherein the die section 27, corresponding to section 7 of die 5, is constructed without a taper for the die opening. The groove in section 27 of Fig. 11, which constitutes a corresponding part of the die opening, is semi-cylindrical and of the same depth and width throughout its length. This type of die is less costly to construct and provides a circumferential contraction of the blank effected by a flattening of the blank, as by a greater steepness of taper of the electrodes 11 and 12 towards the axis of the blank. Such a welding throat 4, as illustrated in Fig. 11, is particularly suited to the welding of relatively thin wall tubing where there is some advantage in flattening the curvature of the metal immediately adjacent the seam.

The construction of Figs. 11 and 12 lends itself to a second modification for use in welding short large diameter cylinders of definite length, as illustrated in Figs. 13 and 14. In this construction the lower section 28 of the die corresponding to section 27 of Figs. 11 and 12 has a length longer than that of the blank being welded and is supported upon rolls 29 so that it moves with the blank longitudinally beneath the die sections 8, 9 and 10 and the electrodes 11 and 12, thereby constituting a moving part of the welding throat 4. This construction substantially reduces the friction upon the blank surface, and at the same time provides a convenient feeding means for the blank.

In the construction of Figs. 13 and 14 the forming and feed rolls 2 and rolls 23 are eliminated. The blank 30, which may constitute a tank shell, is pre-formed into an open cylindrical shape. The die section 28 of this construction reciprocates longitudinally for each operation of the welder and when it is at the loading end, the blank 30 is positioned therein.

A long hydraulic cylinder 31 with a piston 32 therein connected by a piston rod 33 to the end of section 28 serves to reciprocate the latter. Cylinder 31 should be longer than the full reciprocating stroke for the die section 28.

An inward flange or pusher member 34 on the rear end of die section 28 is adapted to engage the tail end of blank 30 to assure feeding of the same through the welding throat 4.

A fixed guide 35 is suspended from the frame of the welder at the mouth of the welding throat 4 to enter between the edges 19 of the blank 30 and align the same parallel to electrodes 11 and 12 as the blank passes through the welding throat.

Where trouble is encountered in not being able to obtain adequate electrode contact pressures, as in the case of the flattening of thin wall tank shells, as described in connection with Figs. 13 and 14, there may be some difficulty in arcing beneath the electrodes with a resulting sticking of copper to the surface of the blank and burning of the electrode contact faces. Where this occurs, the electrode faces should be redressed and some means should be provided to assist in obtaining the required contact pressure.

Figs. 13 and 14 illustrate the use of an internal expansible mandrel 36 in the blank for increasing and adjusting the electrode contact pressure.

The mandrel 36 has a long base 37 with a series of small rollers 38 supporting the same on the bottom of blank 30, or of blank 3, as the case may be. A vertical hydraulic cylinder 39 mounted forwardly on the mandrel base hydraulically supports a pair of mandrel shoes 40 on the inside of the blank immediately beneath the corresponding electrodes 11 and 12. Mandrel shoes 40 are electrically insulated from one another.

By means of adjusting the hydraulic pressure in cylinder 39, the shoes 40 can be made to press upwardly against the inner surface of the blank adjacent the corresponding edges 19 to secure any desired electrode contact pressure. In practice, the electrode contact pressure should be adequate to assure the transmission of the heavy welding current over the area of contact between the electrodes and the blank without danger of arcing or burning of either the electrodes or the blank which constitutes the workpiece.

The mandrel shoes 40 may be held in accurate position relative to electrodes 11 and 12 by securing the base 37 to the guide member 35. In this instance the guide member 35 should contain a tubular passage connecting with cylinder 39 to operate the latter.

Where the mandrel 36 is to be employed with the construction of Figs. 1 to 11, the guide member 35 should also be employed.

The mandrel shoes 40 may be water-cooled similar to electrodes 11 and 12 and may be constructed of the same electrically conductive copper alloy. When this is done, the mandrel shoes 40 generally serve the added purpose of making the flow of current across the edges 19 more uniform for the full thickness of the edges, as illustrated in Fig. 14. The shoes 40 also cooperate with electrodes 11 and 12 in preventing heat softening of the stock back of the edges and which would destroy the ability to obtain the necessary welding pressures.

Figures 15 and 16 illustrate the use of a sleeve 41 for confining the blank and traveling with it through a welding throat 4. The sleeve 41 encircles the blank with the exception of that portion of the blank which contacts with electrodes 11 and 12, and protects the blank against die scratches.

The sleeve 41 is at least as long as the blank 30, and may be made up of separate shorter length sections, if desired.

The sleeve 41 is interlocked with die section 28 to move therewith and thereby feed the blank 30 through the welding throat 4. Where a sleeve is used with a continuous blank, as in Figs. 1 to 12, the sleeve sections may be applied and removed separately and may be engaged by feeding rolls for the purpose of assisting in the feed of the blank through die 5.

The sleeve 41 should be well oiled or greased on the outside where it contacts with the fixed die sections so as to eliminate friction as much as possible. The sleeve serves to eliminate die scratches upon the blank and to radially support the blank as it passes through the welding throat.

Care should be taken to prevent any offsetting of the edges 19 from the proper relation to electrodes 11 and 12, caused by the gripping forces applied to the blank 30 by the sleeve 41 ahead of guide 35.

For this purpose it is desirable to positively align the edges 19 of shell 30 as the shell is positioned in the sleeve 41 and prior to the start of the welding movement.

In some instances it may be desirable to have the sleeve 41 completely encircle the blank 30 with the exception of the region of the seam so that the blank does not contact directly with either the die sections or the electrodes. Such a construction is illustrated in Fig. 17 where the sleeve 41 is shown as extending between the blank 30 and electrodes 11 and 12. In this embodiment the sleeve 41 has its longitudinal edges spaced on opposite sides of the seam and serves to conduct the welding current from electrodes 11 and 12 to the corresponding edges of the blank.

In the embodiment of Fig. 17, the sleeve 41 may have the edge portions thereof which pass beneath electrodes 11 and 12 constructed of electrically conductive alloy material provided in the form of edge extensions 42 secured to the sleeve.

The sleeve 41—42 additionally serves to greatly improve the distribution of welding current to the edges 19 throughout the upsetting zone. The sleeve, being in tight contact with the blank just back of the edges serves to distribute the current longitudinally throughout the welding zone in the desired proportions for correlation to the upsetting pressures. The added thickness of blank thus provided by the sleeve immediately back of the edges 19 serves to introduce the current in a region of less current density and wherein there is considerably less tendency for heating of the blank, so that the heating is more sharply confined to the narrow edge portions 19 and the required high welding pressures can be more readily provided.

The apparatus of the invention may take various forms, depending upon the blank being welded, and may include a sleeve 41 or mandrel 36 in any instance, depending upon the problems encountered. Various feeding means may be employed for the blank so long as a uniform rate of blank movement is provided. Various welding current supply means may be employed so long as a rate of edge heating is maintained in corelation to the progressive upsetting action of the blank edges.

The invention employs a zone of sustained welding pressure which effects a progressive upsetting of the blank edges corelated to the rate of heating of the edges whereby heat-back is prevented and in a sense compensated for so that the metal immediately adjacent and behind the heating and upsetting abutting edge faces remains sufficiently cool at all times to constantly maintain the heavy welding pressures desired.

By lengthening the welding zone, as distinguished from the short weld position of Johnston, the present invention adds the element of time to the welding process, without necessarily requiring additional total time for welding a given length of seam since the blank is moved through the weld zone at a higher linear speed. This added time element provides for a coalescing of the edge faces to form a welded seam of uniformly high quality, and eliminates variations in the weld which would otherwise arise from physical variations in the blank edges.

In general, the higher the speed of movement of the blank through the zone of the welding throat, the longer the throat may be for a given amount of upset. The slower the speed of the blank, the shorter should be the throat. For this reason the present invention provides for substantially higher speeds than Johnston who welds at a point only.

The invention makes it possible to provide a greater total upsetting action where necessary to overcome substantially edge variations as in thick material.

Various embodiments of the invention may be employed within the scope of the accompanying claims.

The invention is claimed as follows:

1. In the electric resistance progressive butt welding of substantially straight seams in articles constructed of metal sheet, plate material and the like, the conductive application of the resistance heating current across the abutting edges throughout a predetermined substantial zonal length of the seam, application of a sustained welding pressure throughout said zonal length, and the correlation thereof with the speed of movement of the material to obtain a sustained continuous upsetting action and completion of the weld at the abutting faces of the edges as the edges progress through the zone so that edge variations within reasonable tolerance limits are overcome without excessive heat back, the flow of heating current across the abutting edges being substantially confined to said zonal length.

2. In the electric resistance progressive butt welding of substantially straight seams in articles constructed of metal sheet, plate material and the like, the conductive application of the resistance heating current across the abutting edges throughout a predetermined substantial zonal length of the seam, application of a sustained welding pressure throughout said zonal length, and the correlation thereof with the speed of movement of the material to obtain a sustained continuous upsetting action and completion of the weld at the abutting faces of the edges as the edges progress through the zone so that edge variations within reasonable tolerance limits are overcome without excessive heat back, the flow of heating current across the abutting edges being substantially confined to said zonal length, said corelation of current and pressure including a compensating control of the heating current during the passage of the forward end of the seam through the zone and a corresponding compensating control of the heating current during the passage of the rear end of the seam through the zone to prevent overheating of the edge faces and consequent heat back whereby a sound weld is produced from end to end of a seam without wasteful end cropping.

3. In the electric resistance progressive butt welding of substantially straight seams in articles constructed of metal sheet, plate material and the like, the conductive application of the resistance heating current across the abutting edges throughout a predetermined substantial zonal length of the seam, application of a sustained welding pressure throughout said zonal length, and the correlation thereof with the speed of movement of the material to obtain a sustained upsetting action and completion of the weld at the abutting faces of the edges as the edges progress through the zone so that edge variations within reasonable tolerance limits are overcome without excessive heat back, said corelation providing a substantially uniform heating current across the abutting edge faces with a substantially continuous upsetting action throughout the length of the zone of heating and a continuing of the welding pressure for an additional predetermined length of the seam immediately after leaving of the heating zone.

4. In the electric resistance progressive butt welding of substantially straight seams in articles constructed of metal sheet, plate material and the like, the conductive application of the resistance heating current across the abutting edges throughout a predetermined substantial zonal length of the seam, application of a sustained welding pressure throughout said zonal length, and the correlation thereof with the speed of movement of the material to obtain a sustained upsetting action and completion of the weld at the abutting faces of the edges as the edges progress through the zone so that edge variations within reasonable tolerance limits are overcome without excessive heat back, said corelation providing a substantially uniform heating current across the abutting edge faces with a substantially continuous upsetting action throughout the length of the zone of heating and a continuing of the welding pressure for an additional predetermined length of the seam immediately after leaving of the heating zone, and the speed of movement of the seam through the welding zone being of an order to substantially eliminate conductive heat back from the edge faces as a factor in the process.

5. The process of claim 4 wherein the metal of the blank immediately adjacent and back of the edge faces is conductively cooled throughout the length of the zone to additionally eliminate the effect of heat back.

6. The process of progressive resistance butt welding opposed edges of metallic plate material, comprising passing said material through a zone of substantial length wherein said edges are caused to abut each other progressively along their coextensive length and wherein such abutting edges are moved toward each other in increasing upsetting relation to provide a sustained continuous welding pressure throughout said zone, and conductively applying a heating current of electricity across said butting edges substantially throughout said zone and substantially confined thereto, in corelation to the speed of movement of the material through the zone and the rate of upset of the edges to complete a weld of the edges within said zone.

7. The process of progressive resistance butt welding opposed edges of metallic plate material, comprising passing said material through a zone wherein said edges are caused to abut each other progressively along their co-extensive length and wherein such butting edges are moved toward each other in increasing upsetting relation to provide a sustained continuous welding pressure throughout said zone, and passing a heating current of electricity across said butting edges substantially throughout said zone and substantially confined thereto, in corelation to the speed of movement of the material through the zone and the rate of upset of the edges to complete a weld of the edges within said zone, the length of said zone being within the range of from ten to thirty times the thickness of the material being welded.

8. The process of progressive electric welding butt seams in articles constructed of metal plate stock, comprising progressively passing the stock through a zone of gradual movement of the butting edges toward one another in increasing upsetting relation to provide a sustained continuous welding pressure throughout a substantial longitudinal length of the edges, and conductively applying a heating current of electricity across the abutting edges substantially throughout the region of said sustained pressure contact therebetween to heat the same to a welding temperature, the length of the zone of sustained welding pressure being sufficient to overcome difficulties arising from physical tolerance variations in the stock edges and the application of the heating current being substantially co-extensive in length with the zone of sustained welding pressure and correlated to the speed of travel of the stock and to the upsetting of the edges to provide only sufficient heat back from the edges for elimination of uneven conditions arising from variations within tolerance limits without destroying the requirement of a narrow heat line at the edges for obtaining the necessary high welding pressures.

9. The electric welding of the longitudinal seam in metal pipe by progressively passing a cylindrical blank through a zone of gradual contraction of its diameter providing a sustained welding pressure on the abutting longitudinal edges thereof for a zonal length generally in excess of about ten times the wall thickness of the blank, and passing a heating current of electricity across the abutting edges substantially throughout the region of said sustained pressure contact therebetween to heat the same to a welding temperature and provide a sufficient heat back from the edges to minimize difficulties arising from initial irregularities of the edges in corelation to the rate of upsetting of the edges whereby the heat back from the edges is compensated by a progressive upsetting of the same to avoid destroying the required final welding pressure, the zone of sustained upsetting pressure continuing after the seam leaves the zone of heating current to provide for complete coalescing of the edge faces in a self sustaining weld at the time of release of the welding pressure.

10. The electric welding of the longitudinal seam in pipe of stainless steel and the like by progressively passing a cylindrical blank through a zone of gradual contraction of its diameter providing a sustained welding pressure on the abutting longitudinal edges thereof for a zonal length generally in excess of about ten times the wall thickness of the blank, the circumferential contraction for the blank being of the order of about the thickness of the blank wall, and passing a resistance heating current across the abutting edges substantially throughout the region of said sustained pressure contact therebetween to heat the same to a welding temperature and provide a sufficient heat back from the edges to minimize difficulties arising from initial irregularities of the edges in correlation to the rate of upsetting of the edges whereby the heat back from the edges is compensated by a progressive upsetting of the same to avoid destroying the required final welding pressure, the zone of sustained upsetting pressure continuing after the seam leaves the zone of heating current to provide for complete coalescing of the edge faces in a self-sustaining weld at the time of release of the welding pressure.

11. In apparatus for electric butt welding seams in articles constructed of metal plate stock, the combination of means to pass the blank progressively through a welding zone, means disposed to advance the opposed edges toward each other in abutting relation effecting an increasing upsetting relation of the edges providing a sustained substantially uniform welding pressure throughout a substantial longitudinal length of the edges in said welding zone, and means contacting with the blank on opposite sides of the seam throughout substantially the entire length of the zone of said sustained welding pressures to supply heating current to the blank and to pass the current across the edges, whereby the heat softening of the edges is corelated to the upsetting of the edges and the speed of movement of the stack to prevent the destruction of the welding pressures at the final point of welding of the edges, said contacting means being disposed substantially within the zonal length of said edge advancing means.

12. In apparatus for electric butt welding seams in articles constructed of metal plate stock, the combination of means to pass the blank progressively through a welding zone, means including dies guiding the edges of the blank into abutting relation and disposed to advance the abutting edges toward each other in a manner effecting an increasing upsetting relation of the edges providing a sustained welding pressure throughout a substantial longitudinal length of the edges in said welding zone, and electrode contact means disposed to supply heating current to the blank on opposite sides of the seam and to pass the current across the edges throughout substantially the entire length of the zone of said sustained welding pressures, whereby the heat softening of the edges is corelated to the upsetting of the edges and the speed of movement of the stock to prevent the destruction of the welding pressures at the final point of welding of the edges, said contacting means being disposed substantially within the zonal length of said edge advancing means.

13. In apparatus for the electric welding of pipe, a long tapered bell adapted to receive the pipe blank and to gradually and progressively reduce the same in circumference as the blank passes therethrough, means to pass the blank longitudinally through the bell, and means to supply heating current to the blank in the region of the edges and to pass the current across said edges throughout substantially the entire length of the zone of contraction of the blank in the bell.

14. In apparatus for the electric welding of pipe, a long tapered bell adapted to receive the pipe blank and to gradually and progressively reduce the same in circumference as the blank passes therethrough, means to pass the blank longitudinally through the bell, a pair of spaced electrode inserts extending longitudinally in said bell and adapted to engage the blank on opposite sides of the longitudinal seam to be welded for substantially the full length of the zone of contraction of the blank, and means to supply welding current to said electrodes to effect passage of the same across said seam.

15. In apparatus for the electric resistance welding of relatively thick wall pipe, a long tapered bell adapted to receive the pipe blank and to gradually and progressively reduce the same in circumference as the blank passes therethrough, means to pass the blank longitudinally through the bell, a pair of spaced electrode inserts extending longitudinally in said bell and adapted to engage the blank on opposite sides of the longitudinal seam to be welded for substantially the full length of the zone of contraction of the blank, and means to supply welding current to said electrodes to effect passage of the same across said seam, the taper of said bell being proportioned to provide a circumferential reduction of the blank substantially equal to the wall thickness of the blank.

16. In apparatus for the electric welding of relatively thick wall pipe, a long tapered bell adapted to receive the pipe blank and to gradually and progressively reduce the same in diameter as the blank passes therethrough, means to pass the blank longitudinally through the bell, means to supply heating current to the blank in the region of the edges and to pass the current across said edges throughout substantially the entire length of the zone of contraction of the blank in the bell with the edges free to expand radially under upsetting forces effected by the reduction in diameter of the blank, and a sizing die disposed in alignment with the welding die and to the rear thereof at a point where the heated weld seam starts to cool and through which the welded blank is passed to additionally upset the weld area and relieve the same of stresses tending to separate the soft weld metal at the seam.

17. In apparatus for the electric welding of relatively thick wall pipe, a long tapered bell adapted to receive the pipe blank and to gradually and progressively reduce the same in diameter as the blank passes therethrough, means to pass the blank longitudinally through the bell, a pair of spaced electrode inserts extending longitudinally in said bell and adapted to engage the blank on opposite sides of the longitudinal seam to be welded for substantially the full length of the zone of contraction of the blank, means disposed to supply welding current to said electrodes and effect flow of the current across said seam, and a sizing die disposed in alignment with the welding die and to the rear thereof at a point where the heated weld seam starts to cool and through which the welded blank is passed to additionally upset the weld area and relieve the same of stresses tending to separate the soft weld metal at the seam.

18. In apparatus for progressive electric resistance welding a longitudinal seam in a tubular blank, means to contract the blank progressively as the blank moves therethrough to apply welding pressure to the abutting seam edges in a welding zone of substantial length, means to supply welding current for passage across the seam in said welding zone for substantially the full length of the zone, and a shield disposed between the blank and said current supply means and movable with the blank through said means to protect the blank from injury and transmit the welding current thereto, said shield being flexible and yieldable with the blank under pressure from said current supply means.

19. In apparatus for progressive electric resistance welding a longitudinal seam in a tubular blank, means to contract the blank progressively as the blank moves therethrough to apply welding pressure to the abutting seam edges in a welding zone of substantial length, means to supply welding current for passage across the seam in said welding zone, and a shield disposed between the blank and both of said means and movable with the blank through said welding zone, said shield being disposed to transmit both the welding pressure and the welding current to said blank.

20. The method of electric resistance butt welding a longitudinal seam in a tubular blank, comprising moving the blank progressively through a welding zone, and applying both welding pressure and welding current to the seam in the welding zone by means of a contact member moving through said zone with the blank to protect the latter from frictional contact in the region of the weld zone.

21. The method of electric resistance butt welding a longitudinal seam in a tubular blank, comprising moving the blank progressively through a welding zone wherein the blank is progressively contracted in diameter by flexing of the walls thereof, and applying welding current across the seam of the blank in said zone by moving a flexible shoe contact member conforming to the shape of the blank on opposite sides of the seam through said zone with the blank to thereby conduct the welding current to the blank and protect the latter from frictional contact in the welding zone.

22. In apparatus for progressive electric resistance welding of pipe or the like, a welding die having a tapered throat through which the blank is passed to contract the same progressively and effect welding of its longitudinal edges, a split sleeve constituting a shoe confining the blank while leaving its edges free to upset between the spaced edges of the sleeve, said sleeve being adapted to pass through the die with the blank and to transmit the contractional forces of said die to the blank while protecting the latter from frictional surface contacts tending to injure the same, and a pair of electrode die inserts in said die adapted to contact the sleeve on the corresponding respective opposite sides of the blank edges and to transmit welding current across the abutting edges of the blank through said sleeve.

23. An apparatus for progressive electric resistance welding of pipe comprising a welding die constituted of a ring member having a long gradually tapered substantially conically shaped opening through which the blank is passed to contract the same and effect welding of its longitudinal edges, a pair of electrode die inserts extending longitudinally in a recess in the inner surface of the die and insulated from each other, means adapted to connect said electrodes to the opposite terminals of a source of welding current, and a split sleeve constituting a shoe substantially confining the blank and having its edges spaced apart on opposite sides of the edges of the blank to provide a circumferential and radial space for the upsetting of the blank edges in welding, said sleeve extending substantially for the length of the blank and adapted to pass through the die with the blank and serving to transmit the welding current from said electrodes to the blank on opposite sides of the seam to heat the same and to transmit the contractional forces of the die to the blank to apply welding pressures to the heated seam.

24. In apparatus for the electric resistance welding of relatively thick wall pipe, a long tapered tubular die adapted to receive the pipe blank and to gradually and progressively reduce the same as the blank passes therethrough, means to pass the blank longitudinally through the die, means to supply heating current to the blank in the region of the edges and to pass the current across said edges throughout substantially the entire length of the zone of contraction of the blank in the die, and a split sleeve constituting a shoe confining the blank circumferentially and longitudinally while leaving the blank edges free to upset between the spaced longitudinal edges of the sleeve, said sleeve being adapted to pass through the die with the blank and to transmit the contractional forces of said die to the blank while protecting the latter from frictional surface contacts tending to injure the same.

25. In apparatus for the electric resistance welding of relatively thick wall pipe, a long tapered tubular die adapted to receive the pipe blank and to gradually and progressively reduce the same as the blank passes therethrough, means to pass the blank longitudinally through the die, means to supply heating current to the blank in the region of the edges and to pass the current across said edges throughout substantially the entire length of the zone of contraction of the blank in the die, and a split sleeve constituting a shoe substantially confining the blank and having its edges spaced apart on opposite sides of the edges of the blank to provide a circumferential and radial space for the upsetting of the blank edges in welding, said sleeve extending substantially for the length of the blank and adapted to pass through the die with the blank and receiving energy from said heating current means, thus serving to transmit the welding current from said heating current means to the blank on opposite sides of the seam to heat the same and to transmit the contractional forces of the die to the blank to apply welding pressures to the heated seam.

26. In apparatus for the electric resistance welding of relatively thick wall pipe, a long tapered tubular die adapted to receive the pipe blank and to gradually and progressively reduce the same as the blank passes therethrough, means to pass the blank longitudinally through the die, a pair of spaced electrode inserts extending longitudinally in said die and adapted to engage the blank on opposite sides of the longitudinal seam to be welded for substantially the full length of the zone of contraction of the blank in the die, means to supply welding current to said electrodes to effect passage of the same across said seam, and a split sleeve constituting a shoe confining the blank while leaving its edges free to upset between the spaced edges of the sleeve, said sleeve being adapted to pass through the die with the blank and to transmit the contractional forces of said die to the blank while protecting the latter from frictional surface contacts tending to injure the same.

27. In apparatus for progressive electric resistance welding a longitudinal seam in a tubular blank, means to contract the blank progressively as the blank moves therethrough to apply welding pressure to the abutting seam edges in a welding zone of substantial length, means to supply welding current for passage across the seam edges throughout substantially the full length of said welding zone, and a shield disposed between the blank and said contracting means and movable with the blank through said means to protect the blank from injury and transmit the contracting pressures thereto, said shield being flexible and yieldable with the blank under pressure from said contracting means.

28. In apparatus for progressive electric resistance welding a seam between two abutting edges of a tubular metal article, a pair of electrodes disposed on opposite sides of the seam in direct contact with the surface of the article blank for a substantial distance longitudinally thereof to apply heating current across said edges as the abutting edges pass longitudinally thereof to weld the same together, a die throat in the region of said electrodes disposed to support the blank thereagainst and to contract the same progressively and thereby apply welding pressure to the abutting edges during passage of the blank through the die, and a shoe engaging the metal of the blank at surface areas thereon removed from the electrodes and disposed to transmit contracting force from the die throat to the blank and to move the article through the die throat to accomplish the welding operation.

29. In apparatus for progressive electric resistance welding a seam between two abutting edges of a tubular metal article, a welding die disposed to receive the article blank and to confine the same under pressure contact for a substantial length of the blank as the latter is moved therethrough to contract the same and comprising electrodes which directly contact said blank on opposite sides of the edges and apply heating current across said edges as the abutting edges pass longitudinally thereof to weld the same together, and a split sleeve constituting a shoe confining said blank to transmit contracting force from the welding die to the blank and to move the same through said die and with the longitudinal edges of the sleeve circumferentially spaced from the electrodes and the abutting edges of said blank.

30. In apparatus for progressive electric resistance welding the longitudinal seam between two abutting edges of pipe or the like, a welding die having a tapered conically shaped opening through which the pipe blank is passed to contract the same and effect welding of said edges,
a split sleeve constituting a shoe confining the blank while passing through the die and forcing the edges of said blank together under contraction by the die, and a pair of electrode die inserts in said die engaging said blank on opposite sides of the abutting edges and between the longitudinal edges of said sleeve to apply welding current across said edges as the latter pass longitudinally thereof.

31. The method of progressive electric resistance butt welding a longitudinal seam in a metal tubular blank, comprising applying welding current from an external source directly to the blank for a substantial and generally unbroken distance longitudinally of the blank and on opposite sides of the seams to effect the passage of heating current across the seam over an extended zone of heating, contracting the blank progressively in said heating zone to apply pressure to the butting edges to effect a weld thereof, and protecting the blank against frictional injury in the region of contraction where pressure contact with the blank is necessary to apply contracting forces thereto, without interfering with the conduction of the welding current to the blank.

32. The method of progressive electric resistance butt welding, comprising moving the blank through a welding zone in which the edges are progressively brought into abutting relation and welding pressure applied thereto, applying welding current from an external source directly to the blank adjacent the seam for a substantial and generally unbroken distance therealong in said welding zone, and protecting the blank against frictional pressure contact in the regions remote from the seam and said zone of application of welding current thereto without interfering with the conduction of welding current to the blank.

33. In apparatus for progressive electric resistance butt welding, a pair of electrodes disposed to contact with the blank on corresponding opposite sides of the seam to be welded each electrode directly contacting the blank for a substantial and generally unbroken distance longitudinally of the seam, means to apply pressure to the blank to gradually contract the same in the region of said electrodes as the blank moves progressively therethrough, and a longitudinally split sleeve confining the blank and disposed to move therewith with the split in the sleeve open and providing a free space for the seam edges and electrodes, said sleeve serving to more effectively apply the welding pressures from said means to the blank without injury to the latter.

SVEN WESTIN.
AXEL WESTIN.

REFERENCES CITED

The following references are of record in the file of this patent:

UNITED STATES PATENTS

| Number | Name | Date |
|---|---|---|
| 1,388,434 | Johnston | Aug. 23, 1921 |
| 1,626,524 | Gedien et al. | Apr. 26, 1927 |
| 1,661,970 | Sessions | Mar. 6, 1928 |
| 1,864,139 | Mark | June 21, 1932 |
| 1,874,399 | White | Aug. 30, 1932 |
| 2,023,085 | Lavallee | Dec. 3, 1935 |
| 2,176,656 | Caputo | Oct. 17, 1939 |
| 2,222,977 | Jones | Nov. 26, 1940 |
| 2,261,684 | Jones | Nov. 4, 1941 |
| 2,326,470 | Lermont et al. | Aug. 10, 1943 |